United States Patent [19]

Meade

[11] Patent Number: 4,702,373

[45] Date of Patent: Oct. 27, 1987

[54] HUB COVER INTERACTING WITH REEL OF MAGNETIC TAPE FOR FORMING DOCUMENT STORAGE COMPARTMENT

[76] Inventor: Dan G. Meade, 3721 W. Kelton La., Phoenix, Ariz. 85023

[21] Appl. No.: 920,730

[22] Filed: Oct. 20, 1986

Related U.S. Application Data

[63] Continuation-in-part of Ser. No. 832,360, Feb. 24, 1986, abandoned.

[51] Int. Cl.⁴ .................. B65D 21/04; B65D 85/67
[52] U.S. Cl. .................... 206/389; 206/226; 206/416; 206/397; 206/406; 206/459
[58] Field of Search .............. 206/226, 303, 389, 397, 206/398, 402, 405, 406, 416, 459, 53, 55, 45.34

[56] References Cited

U.S. PATENT DOCUMENTS

| | | | |
|---|---|---|---|
| 1,036,661 | 8/1912 | Magee, Jr. | 206/303 |
| 1,365,403 | 1/1921 | Holway | 206/226 |
| 1,371,786 | 3/1921 | Hummell et al. | |
| 1,766,257 | 6/1930 | Nielsen et al. | 206/416 |
| 1,861,294 | 5/1932 | Bartlett | 206/226 |
| 1,865,908 | 7/1932 | Hengst | |
| 2,537,184 | 1/1951 | Dunn | 206/226 |
| 2,681,731 | 6/1954 | Chambers | 206/47 |
| 2,794,546 | 6/1957 | Miller | 206/397 |
| 2,851,801 | 9/1958 | Jennings | 48/8 |
| 3,049,227 | 8/1962 | Reinemer | 206/226 |
| 3,559,324 | 2/1971 | Blair | 40/309 |
| 3,907,109 | 9/1975 | Primicerio et al. | 206/406 |
| 3,921,798 | 11/1975 | Dean et al. | 206/53 |
| 3,981,400 | 9/1976 | Quintana | 206/407 |
| 4,051,992 | 10/1977 | Bergstein | 206/45.34 |
| 4,235,335 | 11/1980 | Cosentino | 206/389 |
| 4,382,508 | 5/1983 | Robbins et al. | 206/226 |
| 4,491,222 | 1/1985 | Gaccetta et al. | 206/394 |

FOREIGN PATENT DOCUMENTS 583659 1/1925 France .
380255 9/1932 United Kingdom .

Primary Examiner—George E. Lowrance
Assistant Examiner—Brenda J. Ehrhardt
Attorney, Agent, or Firm—Warren F. B. Lindsley

[57] ABSTRACT

A cover for each end of a magnetic tape reel which cooperates with each other to form a storage compartment within the hub of the reel for documentation relating to the data stored on the associated tape.

8 Claims, 16 Drawing Figures

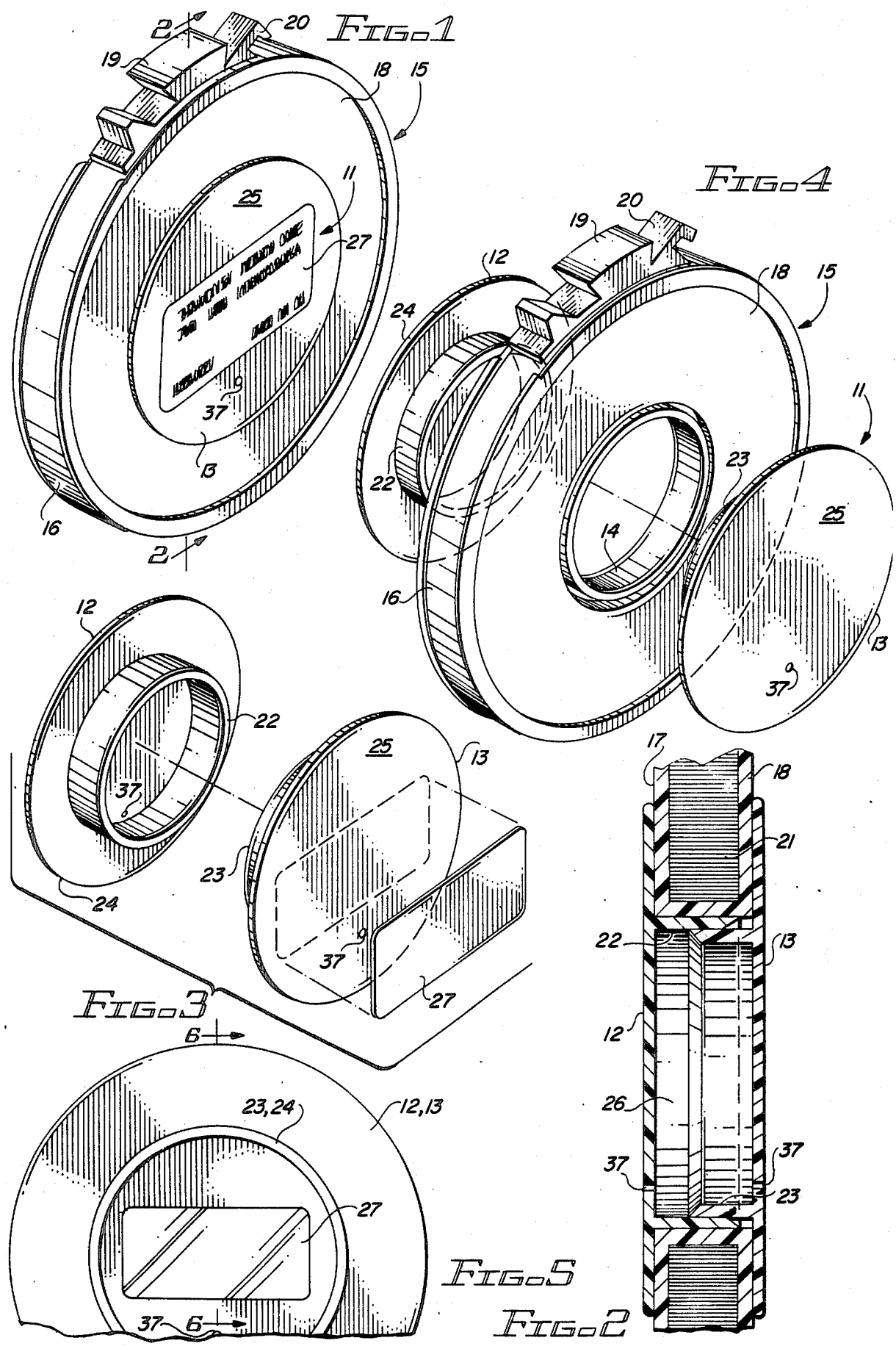

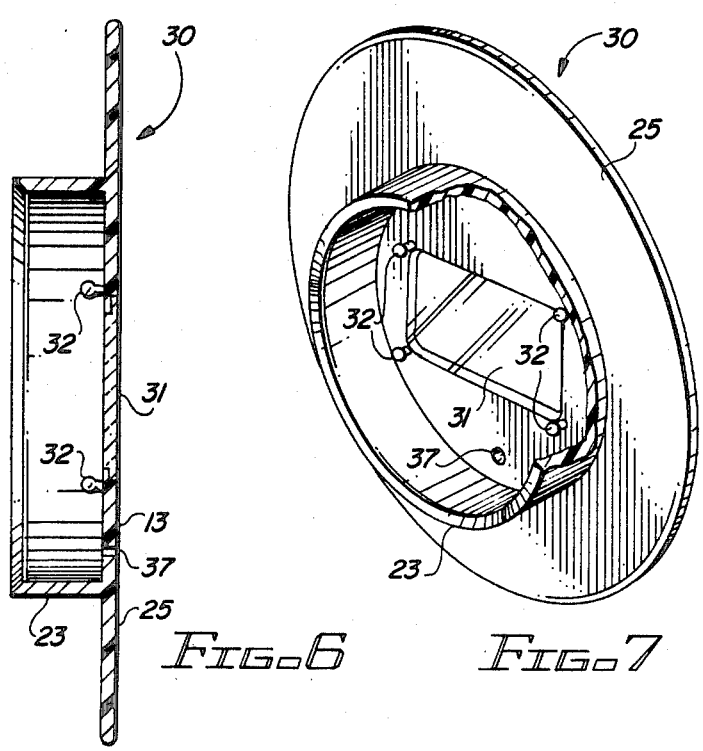
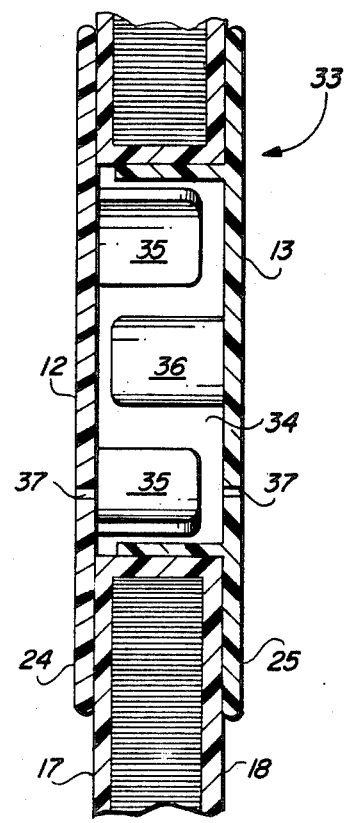
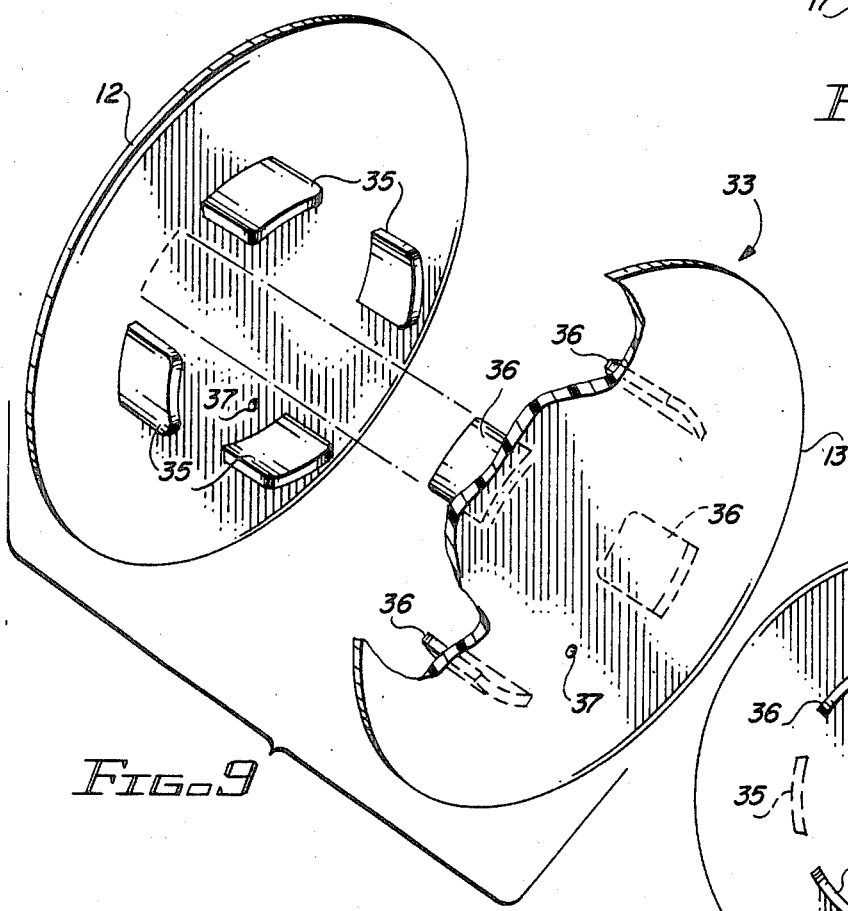
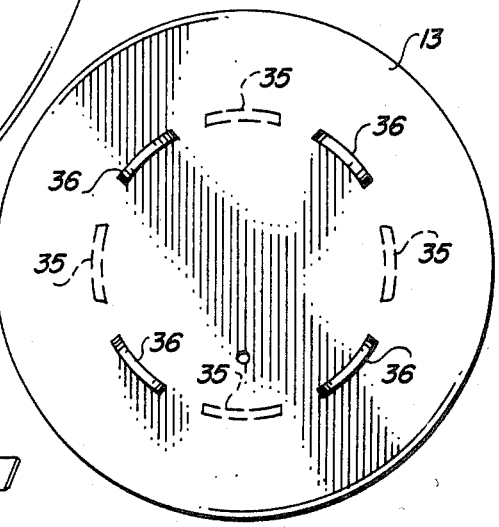
FIG. 6  FIG. 7  FIG. 8  FIG. 9  FIG. 10

HUB COVER INTERACTING WITH REEL OF MAGNETIC TAPE FOR FORMING DOCUMENT STORAGE COMPARTMENT

BACKGROUND OF THE INVENTION

This invention is a continuation in part of U.S. patent application Ser. No. 832,360 filed Feb. 24, 1986 and entitled HUB COVER FOR REELS OF MAGNETIC TAPE FORMING DOCUMENT STORAGE COMPARTMENT.

This invention relates to the storage of identification information for a tape reel and more particularly, to a hub cover for an associated reel which forms a document identification medium and storage compartment.

At the present time, the title and other data related to the reel of tape is noted on a sheet of paper which is adhered to the outside flanges or hub of the reel or forced into its hub where it is easily dislodged and lost. Thus, a need exists for securing identification information and documentation to a tape reel in an easy, safe and secure manner without adding to the overall size of the reel so that the reel can be stored, as now done, in the computer industry.

DESCRIPTION OF THE PRIOR ART

U.S. Pat. No. 1,371,786 discloses a motion picture reel and container therefor, wherein a disc on one side of the package is provided for identification purposes.

U.S. Pat. No. 1,865,908 discloses a control button for threaded bobbins which serves as a medium for identification purposes.

U.S. Pat. No. 2,681,731 discloses a thread and zipper package employing a tubular core formed of a plurality of tabs.

U.S. Pat. No. 2,851,801 discloses a cylindrical core adapted to be placed in the center of a roll of film employing a flat cover disc forming a surface for an indicia bearing member.

U.S. Pat. No. 3,559,324 discloses a transferable tape reel identification disc which is transferable from one reel to another.

U.S. Pat. No. 3,907,109 discloses a container for reeled film or magnetic tape which discloses a pair of tapered latch keys projecting from the base of the container which engage with the cover of the container for detachably holding the cover to the container.

U.S. Pat. No. 4,235,335 discloses a package for dispensing a ribbon of magnetic tape including a pair of annular paperboard sheets each having a pressure sensitive adhesive surface. To form the packages, the adhesive surfaces are pressed against the respective flat surfaces of the roll. The spaced surfaces of the sheets may be used for recording information.

U.S. Pat. No. 4,491,222 discloses a reel package for magnet tape reels in which ten such reels are axially stacked and separated by stacking rings.

French Pat. No. 583,659 discloses a device for insertion in the hub of a reel comprising a pair of flat disc-shaped flanges, each having cylindrical walls extending laterally therefrom which frictionally engage when inserted in opposite ends of the hub to enclose it.

It should be noted that this French patent does not employ a locking device for holding the frictionally engaging cylindrical parts of its device together. As a result, without delicately machining out the engaging cylindrical parts formed of a plastic material available at the date of filing of this French patent, a hub which would always be easy to open or would not fall apart could not be manufactured. The machining of such a part would make it too expensive to be produced in large quantities. Additionally, since any deformation of the part would ruin the part, it would have to be manufactured out of a stiff or hard material.

British Patent No. 380,255 discloses a spool for adhesive plaster or tape wherein the spool is formed of a pair of hollow open ended tubes adapted to fit one within the other to form a central hub. The end discs fastened one to each end of the tube keep both ends of the tube open.

U.S. Pat. Nos. 1,036,661; 1,365,403; 1,766,257; 1,861,294; 2,537,184; 2,794,546; 3,921,798 and 4,173,282 all show some form of packaging structures, including telescopic cylindrical parts. However, none disclose the interlocking means disclosed and claimed herein.

SUMMARY OF THE INVENTION

This invention relates to tape reels and more particularly, to a hub cover for forming a document identification medium and storage compartment for information relating to the data stored on the tape. The hub cover comprises two parts which fit one into each end of the hub of the tape reel without interfering with the manner in which the tape reels are stored and without substantially changing the outer geometrical configuration of the tape reel.

It is, therefore, one object of this invention to provide a new and improved means for storing documental information on a reel of tape.

Another object of this invention is to provide a new and improved storage means for documental information which is secured in the hub of the tape reel.

A further object of this invention is to provide a new and improved storage compartment for one or more sheets of documental information which may be folded, stored and concealed in the hub of the reel and easily and quickly removed when desired.

A still further object of this invention is to provide a new and improved hub cover for documental information relating to the data stored on the reel which comprises two telescopically engaging parts which fits together when inserted into the ends of the hub and interlock with each other by means of the interaction of one of the parts with the hub of the reel.

A still further object of this invention is to provide a simple, economically produced device for storing documents or other data concealed in the hub of the reel.

Other objects and advantages of the present invention will become apparent from the following description when taken in consideration with the accompanying drawings.

BRIEF DESCRIPTION OF THE DRAWINGS

The present invention may be more readily described by reference to the accompanying drawings in which:

FIG. 1 is a perspective view of one embodiment of the present invention showing a hub cover which forms a document storage compartment within the hub of a tape reel;

FIG. 2 is a cross-sectional view of FIG. 1 taken along the line 2—2;

FIG. 3 is an exploded view of the hub cover shown in FIG. 1 illustrating an information panel that may be mounted on the inside of one of the two parts of the hub cover;

FIG. 4 is an exploded view of the tape reel assembly shown in FIG. 1 comprising the two parts of the hub cover without the display panel on one of the interconnecting hub cover parts;

FIG. 5 is a modification of the hub cover shown in FIGS. 1 and 4 wherein one of the telescopically interconnecting parts of the hub cover is provided with a transparent window and card or sheet mounting frame associated therewith;

FIG. 6 is a cross-section of FIG. 5 taken along the line 6—6;

FIG. 7 is a perspective view of FIG. 6 partially broken away to show the transparent window and card or sheet mounting frame;

FIG. 8 is a cross-sectional view of a modification of the hub cover shown in FIGS. 1 and 4 mounted on a reel of tape;

FIG. 9 is an exploded view of the hub cover shown in FIG. 8;

FIG. 10 is a left-end plan view of the right end part of the hub cover shown in FIG. 9;

DESCRIPTION OF THE PREFERRED EMBODIMENT

Figure 11:
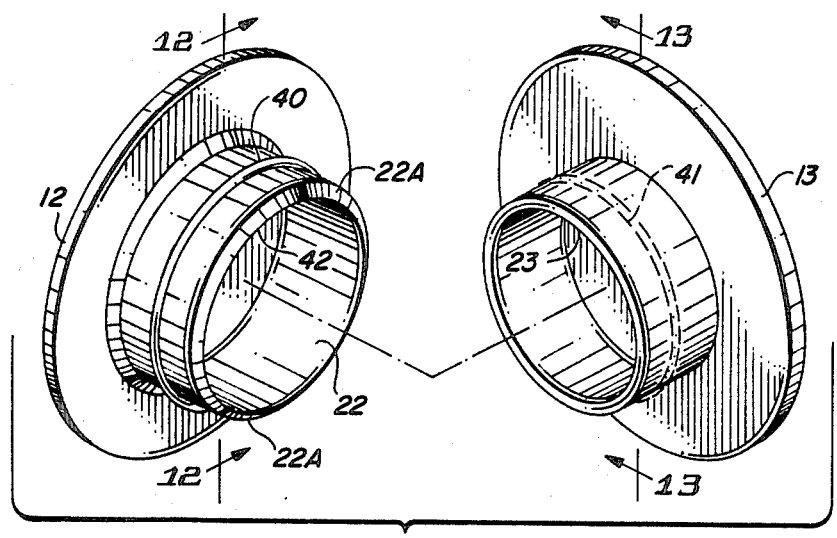
FIG. 11 is an exploded perspective view of a further modification of the structure shown in FIGS. 1-10 wherein one or both of the engaging cylindrical parts employ a locking means for aiding in maintaining the parts together.

Referring more particularly to the drawings by characters of reference, FIGS. 1-3 disclose a hub cover 11 forming a compartment comprising two telescopically interconnecting parts 12 and 13 which extend into hub 14 of a magnetic tape reel 15, one from each end thereof.

Tape reel 15 has wound around its hub 14 a magnetic tape for use on computers comprising a tape length, width and spool diameter of any suitable dimension.

Digital computers have two main data storage areas, the main memory and the backing store, which can be compared to a filing center for storing papers. With the enormous amounts of data handled by a modern computer, it is impractical to store all of the data in the main memory, mainly because of the high cost and the amount of space needed to install sufficient memory units to meet the user's requirements.

Files of data may be stored on tapes, drums or discs, but are usually placed on tapes and discs for backup storage information for the associated computers.

These storage tape reels must be adequately identified before storage so that they can be quickly retrieved and used when needed.

Documentation relating to a particular reel of tape at times requires one or more sheets of information which heretofore have been either stuffed into the hub of the reel where it became quickly dislodged and lost, or stuck under a flange of the reel. Either way of securing the associated documentation was unsatisfactory, particularly when the tape reels were stored as now done by hooking them on a rod or wire in juxtapositioned arrangement with other similarly shaped tape reels.

As shown in FIGS. 1 and 4, a band 16 of plastic or metal is wound around the periphery of a reel of tape 21 wound on hub 14 between flanges 17 and 18 of tape reel 15. The ends of band 16 are fastened together by a clamp 19 which includes a hook 20 for fastening the reel to a rod or wire (not shown) in a manner common in the art.

Parts 12 and 13 of hub cover 11 are telescopically interconnectable with each other by means of axially positioned open ended cylinders or hubs 22 and 23, respectively, that extend laterally from the associated part toward each other from different ends of hub 14 of reel 15. Both hubs are slightly smaller in diameter than the diameter of hub 14 of reel 15 with hub 22 being slightly larger in diameter than hub 23 so that they can be telescopically interconnected as shown in FIG. 2.

The flat surfaced flanges 24 and 25 of parts 12 and 13, respectively, are larger than the diameter of hub 14 of reel 15, but smaller than the diameter of flanges 17 and 18 of reel 15. These flanges of parts 12 and 13 lie parallel with and juxtapositioned to the associated flanges of reel 15 with parts 12 and 13 being inserted in hub 14 from opposite ends thereof to telescopically engage, as shown in FIG. 2.

Within the telescopically engaging hubs 22 and 23 of hub cover 11 is formed an opening or compartment 26 for storing documentation (not shown) relating to the data on tape 21. Access to these documents is easily accomplished by merely removing one of the parts 12 or 13 of the hub cover 11 from hub 14 of reel 15. If desired, the outside surface of flange 25 of part 13 of hub cover 11 may be partially covered by an information bearing label 27, as shown in FIG. 1.

FIGS. 5, 6 and 7 illustrate a modification of the hub cover 11 shown in FIGS. 1-4 wherein like parts are provided with similar reference characters. Hub cover 30 differs from hub cover 11 by providing a transparent window 31 in one of the flanges 24 or 25 of the storage compartment. As shown in these figures, window 31 is provided in flange 25 of part 13 and further employs a plurality of knobs 32 which are secured to or formed on the inside surface of flange 25 with each having a slightly larger head than its stem. These knobs may be positioned to support an information bearing card (not shown) over the inside surface of window 31 so that the information thereon may be observed from the outside of the hub cover 30.

FIGS. 8-10 disclose a further modification of the hub covers shown in FIGS. 1-7 wherein like parts are given the same reference characters.

In FIGS. 8-10, hub cover 33 differs from hub covers 11 and 30 by utilizing a hub structure comprising a plurality of prongs 35 and 36 that are spacedly positioned around the axis of flanges 24 and 25 of parts 12 and 13, as shown.

These prongs are spring biased so as to engage the inside periphery of hub 14 of reel 15 in a frictional arrangement. This hub cover holds and conceals sheets of documentation within the hub of the reel. Retrieval of the documentation may be implemented by merely removing parts 12 or 13 from either side of the hub of reel 15.

As shown in the figures of the drawings, a vent hole 37 is provided in the flanges of the parts of the hub covers to aid in controlling the air pressure in the hub of the tape reel during attachment and disengagement of its various parts.

FIGS. 11-15 disclose further modifications of the hub covers shown in FIGS. 1-10 wherein the telescopically interconnecting parts are provided with a locking means for holding the engaging parts together.

It should be noted that the tape hub cover must hold together firmly, yet not so firmly as to be difficult to open. At the same time, however, the hub cover ceases to be useful if it opens so easily that it can be opened unintentionally and the contents lost.

Additionally, the tape hub cover must function properly over a wide range of temperatures with tapes frequently being stored at temperatures as low as 65 degrees F or as high as 100 degrees F.

Since the tape hub cover must be non-injurious to the tape reel, inexpensive to manufacture and have a long lifetime, it becomes apparent that the hub cover must be composed of a very flexible, resilient material. A hard material with a diameter close to that of the hole in the tape reel could damage the tape reel if not aligned perfectly before installation and would be prone to breaking due to its thin walls.

Unfortunately, the requirement that the hub cover be composed of a flexible material introduces a variety of problems which were not addressed by the French patent of record, and which render the French patent of record useless as a tape hub cover. These problems result because inexpensive, flexible materials are difficult to manufacture to tight tolerances, and are prone to significant expansion or contraction when exposed to hot and cold temperatures. Since the French patent of record has no locking mechanism, it must be manufactured to tight specifications, and it will be prone to locking up or falling apart when exposed to temperature extremes.

Figures 12, 13:
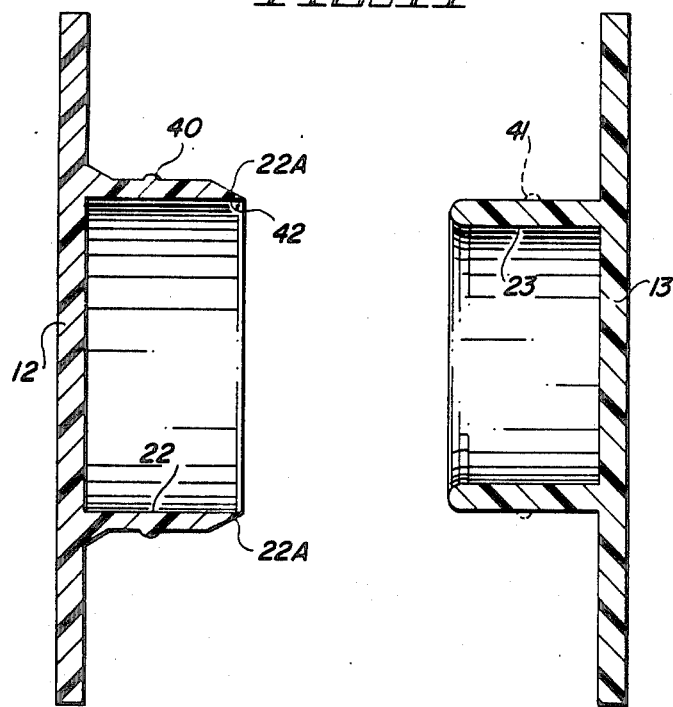
FIG. 12 is a cross-sectional view of FIG. 11 taken along the line 12-12.
FIG. 13 is a cross-sectional view of FIG. 12 taken along the line 13-13.

In FIGS. 11-13, parts similar to those shown in FIGS. 1-4 are given the same reference characters. Further, hub 22 is provided with a taper edge 22A which aids in inserting it in hub 14 of reel 15.

To aid in holding the interconnecting parts 12 and 13 together in hub 14 of reel 15, hub 22 is provided with a locking means such as a protrusion 40 which extends outwardly of the top surface of hub 22 and extends around its periphery parallel with the surface of part 12 for engaging with the inside periphery of hub 14 of reel 15 when inserted therein.

The unique feature of this locking ring or protrusion 40 is that it uses the inside surface of hub 14 of reel 15 to cause a locking action which frictionally binds the inside periphery of hub 22 to the outer surface of the hub 23. Due to the result of this locking action, it actually becomes possible to use a hub cover in which the inner and outer engaging parts are sufficiently mismatched in size that they would fall apart if assembled outside of a tape reel.

The locking action is achieved by designing hub 22 with protrusion 40, which causes the outer half of the hub to actually exceed the size of the hole in the tape reel. This protrusion may be either small lumps or bulges added to the outer surface of hub 22 which contacts the inside periphery of the tape reel, or they can be a ring, as shown in FIG. 11, around the entire hub 22. In either case, pushing hub 22 into tape reel 15 causes hub 22 to experience a small deformation (contraction). This contraction is largest at the open end of the hub 22 where hub 23 is inserted. This contraction results in hub 22 gripping hub 23, even if a significant size mismatch exists. If an environmental condition exists which causes the hub to expand in size, the tape reel forces hub 22 to deform to the desired size. It should be noted that the hub is manufactured to a dimension which prevents expansion to a size which could damage the tape reel. If environmental conditions cause hub 22 to shrink, hub 22 being larger than hub 23 shrinks more than hub 23 and grips hub 23 through an ordinary friction fit.

As a further aid in interlocking hubs 22 and 23 together, hub 23 may be provided with one or more lumps or bulges around its inside periphery. As shown in FIGS. 11 and 13, those protrusions may comprise a ring 41 arranged to extend around the outer periphery of hub 23. This ring frictionally engages with inner surface 42 of hub 22, causing a deformation of hub 23 which aids in binding the telescopically interconnecting hubs 22 and 23.

It should also be noted that this invention does not actually require the parts of the hub cover to be cylindrical in shape. The container portion of the hub cover could just as easily have been square or rectangular without interfering with the storage of paper in the hub of the reel. It is only necessary that the part be deformed to create a gripping action.

Figure 16:
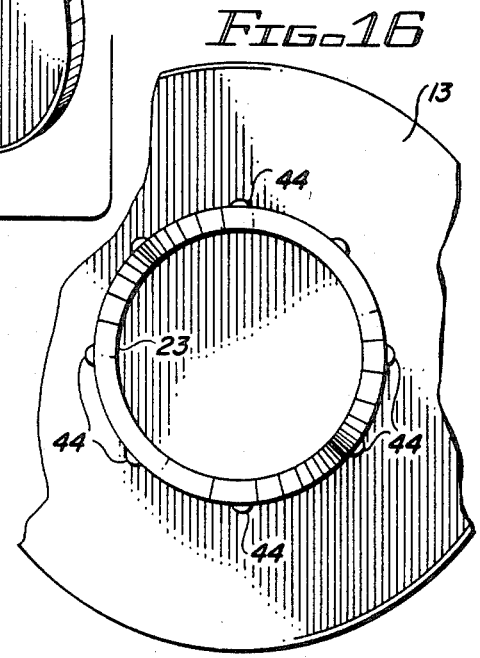
FIG. 16 is a partial right end view of cover 13 showing ridges forming a locking means positioned on hub 23.
Figure 15:
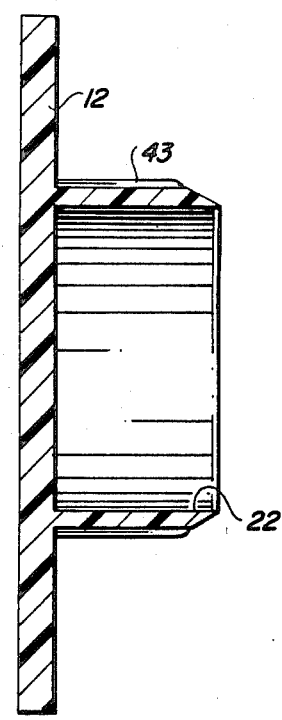
FIG. 15 is a cross-sectional view of FIG. 14 taken along the line 15-15.
Figure 14:
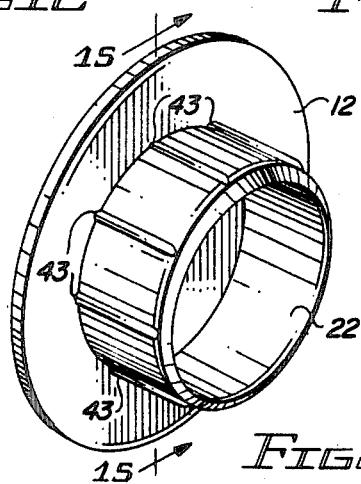
FIG. 14 is a perspective view of a further modification of the locking means shown in FIGS. 11-13.

FIGS. 14-16 disclose a further modification of the locking means 40 and 41, shown in FIGS. 11-13, wherein a plurality of spacedly positioned ridges 43 are mounted along the outer periphery of hub 22 and parallel with its longitudinal axis and a plurality of spacedly positioned ridges 44 mounted along the outer periphery of hub 23 and parallel with its longitudinal axis.

These ridges function as locking means in the same manner as rings 40 and 41 disclosed in FIGS. 11-13.

Thus, improved and specialized hub covers are provided for attachment to the hub ends of a tape reel to provide storage compartments in accordance with the stated objects of the invention. Although but a few embodiments of the invention have been illustrated and described, it will be apparent to those skilled in the art that various changes and modifications may be made therein without departing from the spirit of the invention or from the scope of the appended claims.

What is claimed is:

1. A device for storing documentation in the hollow hub of a magnetic tape reel comprising:
    a pair of flat disc-shaped flanges, each having a planar surface and first and second means extending laterally one from each planar surface into the hub from a different end thereof with said first means overlapping said second means when the flanges are abuttingly arranged, one adjacent each side of the tape reel,
    said first means being provided with protrusion means extending outwardly thereof for engaging the hub of the associated reel when inserted therein which hub causes a deflection of said first means toward and into frictional engagement with said second means when inserted in the hub,
    said first and second means forming a compartment within the hollow interior of the hub for document storage purposes,
    said first and second means each comprising an open cylinder, the diameter of which is slightly smaller than the diameter of the hub of the reel with the diameter of one of said means being slightly smaller than the other so as to telescopically engage the other when said flanges are each juxtapositioned to a different side of the reel.

2. The device set forth in claim 1 wherein: said protrusion means comprises a first annular ring extending around the periphery of said cylinder of said first means at a point along its length.

3. The device set forth in claim 2 wherein: said ring is parallel with said flanges.

4. The device set forth in claim 1 wherein:
said protrusion means comprises at least a pair of diametrically opposed ridges extending along at least a part of the length of the cylinder forming said first means.

5. The device set forth in claim 2 in further combination with:
a second annular ring extending around the periphery of said cylinder of said second means at a point along its length for engaging the inside periphery of said cylinder of said first means.

6. The device set forth in claim 1 wherein:
one of said flanges is provided with a transparent window.

7. The device set forth in claim 6 in further combination with:
knob means secured to the surface of said one of said flanges around said window for holding an information card against said window.

8. The device set forth in claim 1 wherein:
each of said flanges is provided with a vent hole extending therethrough.

* * * * *